(12) United States Patent
Matsuda (10) Patent No.: US 10,455,175 B2
(45) Date of Patent: Oct. 22, 2019

(54) SOLID STATE IMAGING DEVICE AND IMAGING APPARATUS INCLUDING CLIPPING SECTIONS CLIPPING THE VOLTAGE OF VERTICAL SIGNAL LINE TO A PREDETERMINED VALUE

(71) Applicant: NIKON CORPORATION, Tokyo (JP)

(72) Inventor: Hideaki Matsuda, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 37 days.

(21) Appl. No.: 14/367,971

(22) PCT Filed: Dec. 27, 2012

(86) PCT No.: PCT/JP2012/008393
§ 371 (c)(1),
(2) Date: Aug. 28, 2014

(87) PCT Pub. No.: WO2013/099265
PCT Pub. Date: Jul. 4, 2013

(65) Prior Publication Data
US 2014/0368713 A1 Dec. 18, 2014

(30) Foreign Application Priority Data
Dec. 28, 2011 (JP) .................................. 2011-288162

(51) Int. Cl.
*H04N 5/374* (2011.01)
*H04N 5/351* (2011.01)
(Continued)

(52) U.S. Cl.
CPC .............. *H04N 5/374* (2013.01); *H04N 5/351* (2013.01); *H04N 5/359* (2013.01); *H04N 5/3658* (2013.01)

(58) Field of Classification Search
CPC ........ H04N 5/374; H04N 5/351; H04N 5/359; H04N 5/3658
See application file for complete search history.

(56) References Cited

U.S. PATENT DOCUMENTS 7,569,868 B2 * 8/2009 Watanabe ............... H04N 3/155
257/184
7,817,199 B2 * 10/2010 Yamashita ........... H04N 5/3598
250/214 A
(Continued)

FOREIGN PATENT DOCUMENTS

CN 1490879 A 4/2004
JP A-2007-20156 1/2007
(Continued)

OTHER PUBLICATIONS

Sep. 8, 2015 Japanese Office Action issued in Japanese Patent Application No. 2013-551470.
(Continued)

*Primary Examiner* — Luong T Nguyen
(74) *Attorney, Agent, or Firm* — Oliff PLC (57) ABSTRACT

A voltage limiting unit of a solid state imaging device limits a voltage of a signal line so as not to become a predetermined value or less. A signal processing unit to which a pixel signal is input via a signal line. A controlling unit is disposed between the voltage limiting unit and the signal processing unit on the signal line. Further, the controlling unit causes the voltage limiting unit and the signal processing unit to be non-conductive in a period in which a transfer unit of a pixel transfers the electric charge converted by a photoelectric conversion unit of the pixel to a floating diffusion region of the pixel.

19 Claims, 7 Drawing Sheets

(51) Int. Cl.
*H04N 5/359* (2011.01)
*H04N 5/365* (2011.01)

(56) References Cited

U.S. PATENT DOCUMENTS

| | | | | |
|---|---|---|---|---|
| 7,906,752 | B2* | 3/2011 | Fukuoka | H04N 5/3598 250/208.1 |
| 8,045,032 | B2* | 10/2011 | Muroshima | H04N 5/3575 250/208.1 |
| 8,134,622 | B2* | 3/2012 | Kobayashi | H04N 5/335 348/300 |
| 8,294,798 | B2* | 10/2012 | Fukuoka | H04N 5/35527 348/300 |
| 8,411,175 | B2* | 4/2013 | Sato | H04N 5/3675 348/241 |
| 2006/0279650 | A1 | 12/2006 | Watanabe et al. | |
| 2009/0079849 | A1* | 3/2009 | Kondo | H04N 5/353 348/231.99 |
| 2011/0278652 | A1 | 11/2011 | Shima | |
| 2011/0292264 | A1* | 12/2011 | Kubo | H04N 5/3598 348/301 |
| 2012/0153131 | A1 | 6/2012 | Ishimoto et al. | |

FOREIGN PATENT DOCUMENTS

| | | |
|---|---|---|
| JP | A-2010-187230 | 8/2010 |
| JP | A-2010-278786 | 12/2010 |
| JP | 2011061270 A | 3/2011 |

OTHER PUBLICATIONS

Feb. 23, 2016 Office Action issued in Japanese Patent Application No. 2013-551470.
International Search Report issued in PCT/JP2012/008393 dated Mar. 5, 2013.
International Preliminary Report on Patentability issued in PCT/JP2012/008393 dated Jul. 1, 2014 (with translation).
Aug. 30, 2016 Decision of Refusal issued in Japanese Application No. 2013-551470.
Oct. 10, 2016 Office Action issued in Chinese Patent Application No. 201280065106.9.
Jun. 21, 2019 Office Action issued in Chinese Patent Application No. 201710585034.5.

* cited by examiner

SOLID STATE IMAGING DEVICE AND IMAGING APPARATUS INCLUDING CLIPPING SECTIONS CLIPPING THE VOLTAGE OF VERTICAL SIGNAL LINE TO A PREDETERMINED VALUE

CROSS-REFERENCE TO RELATED APPLICATION

This application is a U.S. National Stage application claiming the benefit of prior filed International Application Number PCT/JP2012/008393, filed Dec. 27, 2012, in which the International Application claims a priority date of Dec. 28, 2011 based on prior filed Japanese Application Number 2011-288162, the entire contents of which are incorporated herein by reference.

TECHNICAL FIELD

The present application relates to a solid state imaging device and an imaging apparatus.

BACKGROUND ART

In some of CMOS (Complementary Metal Oxide Semiconductor) type solid state imaging devices, a CMOS device is conventionally known in which an amplifying section (hereafter, also referred to as a column amplifier) to amplify pixel signals of each of pixels arranged in a matrix form is disposed for each column. Further, in order to suppress rapid fluctuation of the output of a column amplifier, it has been also proposed to dispose in a solid state imaging device a connecting switch which makes a vertical signal line and the column amplifier non-conductive in a period during which a transfer transistor of pixels is being ON.

Patent Document 1: Japanese Unexamined Patent Application Publication No. 2010-278786

DISCLOSURE

Problems to be Solved

When high luminance light enters a CMOS type solid state imaging device, fluctuation of electric potential arises in the horizontal direction (row direction) on a region in which the high luminance light entered, and streak-shaped noise (smear) may occur on an image. In particular, in a period during which a transfer transistor of pixels is being ON, if the above connecting switch is turned OFF, a period of time until the output level of the column amplifier statically settles to a prescribed voltage may become longer. Further, at the time of reading out pixels on the high luminance light-entered region, when the electric potential of a vertical signal line approaches to a GND level, since the operation point of the constant current source of the column becomes out of a constant current operation range, a current value decreases, and an IR drop amount of a circuit changes. Accordingly, a voltage value of the circuit also changes. Therefore, for example, at the time of reading out images at high speed, the above-mentioned smear tends to occur.

Means for Solving the Problems

A solid state imaging device according to one embodiment of the present invention includes a pixel, a voltage limiting unit, a signal processing unit, and a controlling unit. The pixel includes a photoelectric conversion unit converting incident light into electric charge, a transfer unit transferring the electric charge converted by the photoelectric conversion unit to a floating diffusion region, and an output unit outputting a pixel signal corresponding to the electric charge transferred to the floating diffusion region to a signal line. The voltage limiting unit is connected to a signal line and limits a voltage of the signal line so as not to become a predetermined value or less. The pixel signal is input to the signal processing unit via the signal line. The controlling unit is disposed between the voltage limiting unit and the signal processing unit on the signal line. Further, the controlling unit causes the voltage limiting unit and the signal processing unit to be non-conductive in a period in which the transfer unit transfers the electric charge converted by the photoelectric conversion unit to the floating diffusion region.

A solid state imaging device according to another embodiment of the present invention includes a first pixel, a second pixel, a first voltage limiting unit, a second voltage limiting unit, a signal processing unit, and a controlling unit. The first pixel includes a first photoelectric conversion unit converting incident light into electric charge, a first transfer unit transferring the electric charge converted by the first photoelectric conversion unit to a first floating diffusion region, and a first output unit outputting a first pixel signal corresponding to the electric charge transferred to the first floating diffusion region to a first signal line. The second pixel includes a second photoelectric conversion unit converting incident light into electric charge, a second transfer unit transferring the electric charge converted by the second photoelectric conversion unit to a second floating diffusion region, and a second output unit outputting a second pixel signal corresponding to the electric charge transferred to the second floating diffusion region to a second signal line. The first voltage limiting unit is connected to the first signal line and limits the voltage of the first signal line so as not to become a predetermined value or less. The second voltage limiting unit is connected to the second signal line and limits the voltage of the second signal line so as not to become a predetermined value or less. The first pixel signal is input to the signal processing unit via the first signal line and the second pixel signal is input to the signal processing unit via the second signal line. The controlling unit is disposed between the first voltage limiting unit and the signal processing unit, and between the second voltage limiting unit and the signal processing unit. The controlling unit causes the first voltage limiting unit and the signal processing unit to be non-conductive in a first transfer period in which the first transfer unit transfers the electric charge converted by the first photoelectric conversion unit to the first floating diffusion region. Further, the controlling unit causes the second voltage limiting unit and the signal processing unit to be non-conductive in a second transfer period in which the second transfer unit transfers the electric charge converted by the second photoelectric conversion unit to the second floating diffusion region.

DETAILED DESCRIPTION OF THE EMBODIMENTS

<Description of a First Embodiment>

Figure 1:
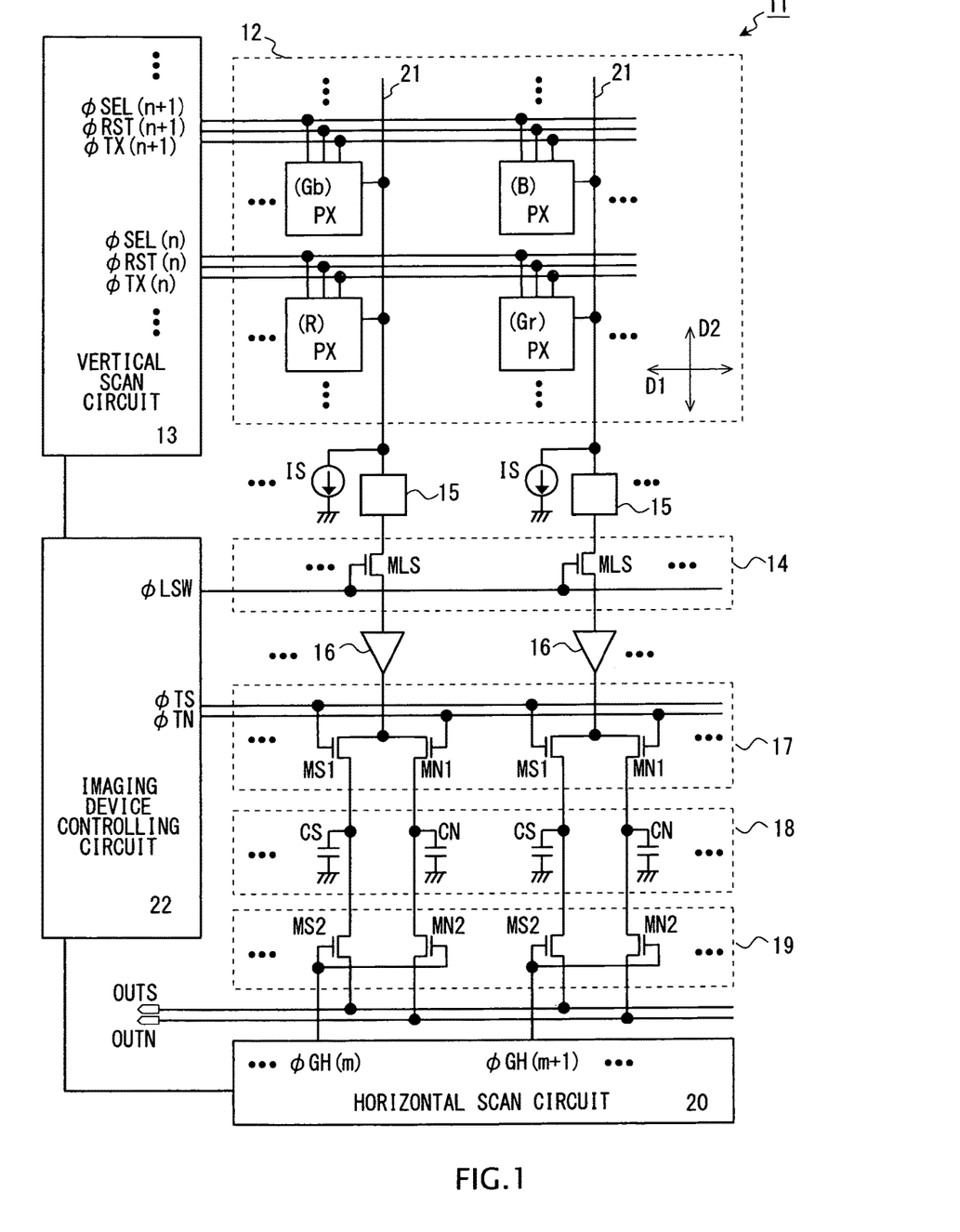
FIG. 1 is a block diagram illustrating a configuration example of a solid state imaging device according to a first embodiment.

FIG. 1 is a block diagram illustrating a configuration example of a solid state imaging device according to a first embodiment. The solid state imaging device according to the first embodiment is an XY address type solid state imaging device formed on a silicon substrate by using a CMOS process. The solid state imaging device according to the first embodiment is mounted in imaging apparatuses, such as a digital still camera and a video camera (in this connection, a configuration example of such an imaging apparatus will be described later).

The solid state imaging device 11 includes, for example, a pixel array 12, a vertical scan circuit 13, a row selecting switch section 14 serving as one example of the connecting switch, a clip section 15, an amplifying section 16 (hereafter, also referred to as a column amplifier), an accumulated signal selecting section 17, a signal accumulating section 18, a horizontal selecting switch section 19, a horizontal scan circuit 20, a vertical signal line 21 serving as one example of a signal read-out line, a constant current source IS, and an imaging device controlling circuit 22.

The pixel array 12 includes a plurality of pixels PX arranged in a first direction D1 and a second direction D2 in a matrix form. Hereafter, the first direction D1 and the second direction D2 are also referred to as a row direction D1 and a column direction D2, respectively.

On each of front surfaces of the pixels PX, a plurality of kinds of color filters transmit respective different color component light rays are disposed in a predetermined color arrangement. Accordingly, each pixel outputs an electric signal corresponding to one of colors separated by the color filters. As a result, the pixel array 12 is enabled to acquire a color image at the time of imaging.

For example, in the first embodiment, color filters of red (R), green (Gr, Gb), and blue (B) are arranged in accordance with a Bayer array having two rows and two columns for the respective pixels PX. In FIG. 1, each pixel PX is shown together with the color of the corresponding color filter. Further, the pixels PX having the respective red (R), green (Gr, Gb), and blue (B) filters are also referred to as a red pixel (R), a blue pixel (B), and a green pixel (Gr, Gb), respectively.

When focusing attention on the row direction D1, for example, on the n-th row of the pixel array 12, a red pixel (R) and a green pixel (Gr) are arranged alternately. Further, for example, on the (n+1)-th row of the pixel array 12, a green pixel (Gb) and a blue pixel (B) are arranged alternately.

When focusing attention on the column direction D2, for example, on the m-th column of the pixel array 12, a green pixel (Gb) and a red pixel (R) are arranged alternately.

Further, for example, on the (m+1)-th column of the pixel array 12, a blue pixel (B) and a green pixel (Gr) are arranged alternately.

Here, the plurality of pixels PX arranged in the column direction D2 are connected to each other by the vertical signal line 21 disposed for each column. That is, the pixel array 12 outputs pixel signals from the plurality of pixels PX arranged on the same column through the common vertical signal line 21.

Further, in order to read out a pixel signal from each pixel PX, a constant current source IS is connected to each vertical signal line 21 for each column of the pixels of the pixel array 12.

The vertical scan circuit 13 controls the pixels PX of the pixel array 12 for each row by using control signals φSEL, φRST, and φTX. For example, the vertical scan circuit 13 controls control signals φSEL (n), φRST (n), and φTX (n) so as to output the pixel signal of each of the pixels PX on the n-th row to the respective vertical signal lines 21. Further, for example, the vertical scan circuit 13 controls control signals φSEL (n+1), φRST (n+1), and φTX (n+1) so as to output the pixel signal of each of the pixels PX on the (n+1)-th row to the respective vertical signal lines 21. Hereafter, the control signals φSEL, φRST, and φTX are also referred to as a selection signal φSEL, a reset signal φRST, and a transfer signal φTX, respectively.

The row selecting switch section 14 is disposed at the input side of the column amplifier 16, and includes multiple row selecting switches MLS for the respective columns of the pixels of the pixel array 12. The row selecting switch MLS switches over conduction and non-conduction between the vertical signal line 21 and the column amplifier 16.

Further, the clip section 15 is disposed at the input side (between a pixel PX and the row selecting switch section 14) of the row selecting switch section 14 in each of the vertical signal lines 21. The clip sections 15 clip the voltage of the vertical signal line 21 to a predetermined value.

The column amplifier 16 is, for example, an inverting amplifier configured by using an operational amplifier, and is disposed for each column of the pixels PX of the pixel array 12. Each of the column amplifiers 16 inverts and amplifies a pixel signal output from each pixel PX through each of the vertical signal lines 21 for each column.

Figure 2:
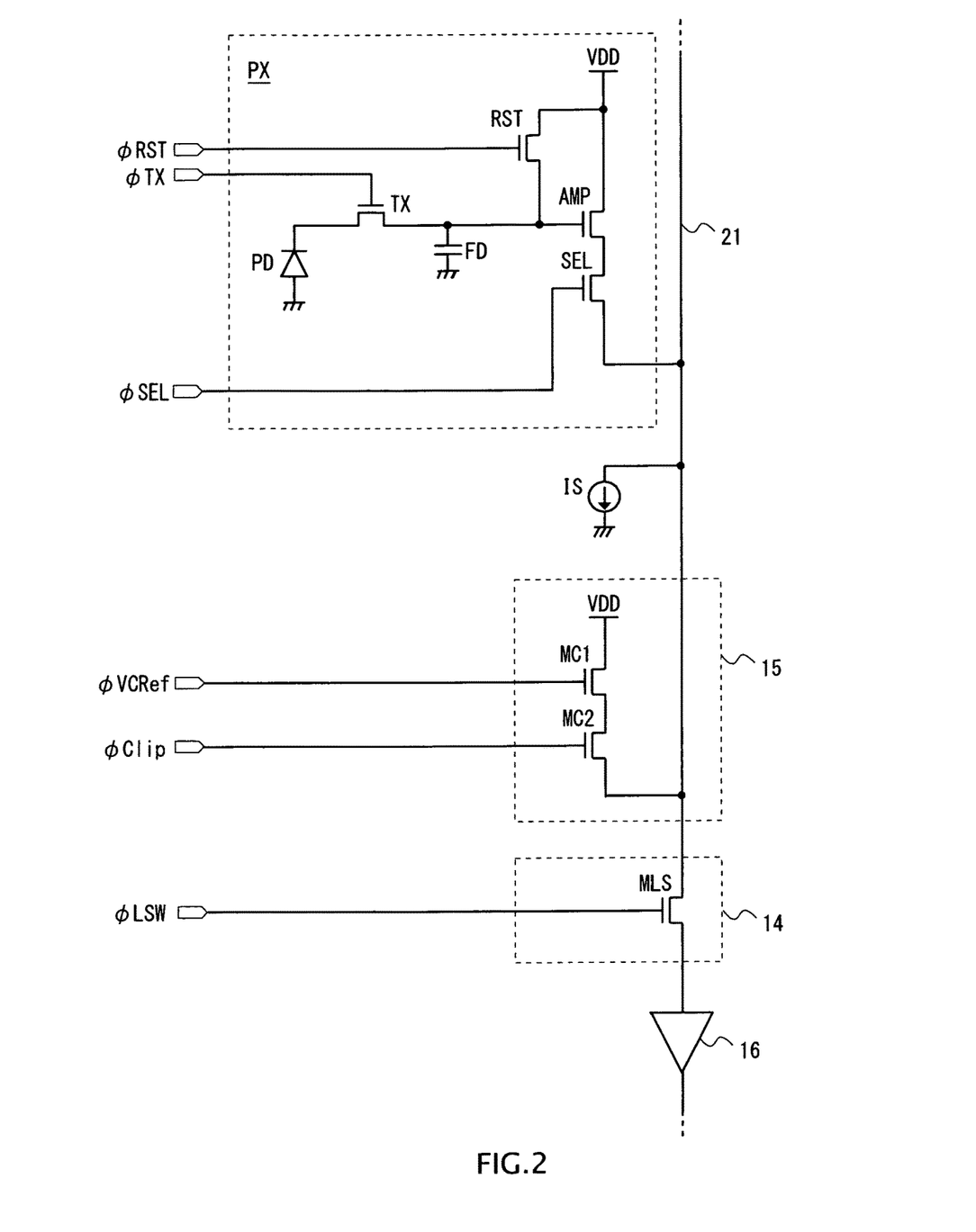
FIG. 2 is a diagram illustrating a configuration example of a pixel, a clip section, a row selecting switch section, and a column amplifier.

Here, description is given to the respective configuration examples of the pixel PX, the clip section 15, the row selecting switch section 14, and the column amplifier 16 with reference to FIG. 2.

The pixel PX includes a photo diode PD, a transfer transistor TX, a reset transistor RST, an amplification transistor AMP, a selection transistor SEL, and a floating diffusion area FD.

The photo diode PD is an example of photoelectric conversion devices, and produces electric charge by photoelectric conversion in accordance with a light quantity of incident light. The transfer transistor TX is an example of transfer switches, and becomes ON in a high level period of a transfer signal φTX so as to transfer the electric charge accumulated in the photo diode PD to the floating diffusion region FD.

The source of the transfer transistor TX is the photo diode PD, and the drain of the transfer transistor TX is the floating diffusion region FD. The floating diffusion region FD may be, for example, a diffusion region formed by introducing impurities into a semiconductor substrate. Here, the floating diffusion region FD is connected to each of the gate of the amplification transistor AMP and the source of the reset transistor RST.

The reset transistor RST becomes ON in a high level period of the reset signal φRST so as to reset the floating diffusion region FD to the power source voltage VDD. Further, in the amplification transistor AMP, its drain is connected to the power source voltage VDD, its gate is connected to the floating diffusion region FD, and its source is connected to the drain of the selection transistor SEL so as to configure a source follower circuit in which the constant current source IS connected to the vertical signal line 21 is made a load. The amplification transistor AMP outputs a read-out voltage via the selection transistor SEL in response to the voltage value of the floating diffusion region FD. The selection transistor SEL becomes ON in a high level period of the selection signal φSEL so as to connect the source of the amplification transistor AMP to the vertical signal line 21.

The clip section 15 includes a clip voltage producing transistor MC1 and a clip voltage control transistor MC2 which are connected in the form of a cascode connection circuit. In the clip voltage producing transistor MC1, its drain is connected to the power source voltage VDD, its source is connected to the drain of the clip voltage control transistor MC2, and its gate receives a clip voltage VCRef. Further, the source of the clip voltage control transistor MC2 is connected to the vertical signal line 21, and the gate of the clip voltage control transistor MC2 receives the control signal φClip. The clip voltage producing transistor MC1 and the clip voltage control transistor MC2 are also referred to as transistors MC1 and MC2, respectively.

When the control signal φClip is being a high level, the clip section 15 clips the voltage of the connected vertical signal line 21 to a predetermined value determined by the clip voltage VCRef. That is, when the output voltage of the pixel is high, the voltage is output as it is. On the other hand, when the output voltage of the pixel is lower than a predetermined value, a predetermined voltage determined by the clip section 15 is output, whereby the voltage of the vertical signal line 21 is made not to get lower than the predetermined value. Here, the above-mentioned predetermined value is, for example, a value obtained by subtracting from the applied voltage of VCRef a voltage (threshold voltage) between the gate and source of the transistor MC1, and further subtracting a voltage between the drain and source when the transistor MC2 is ON. Further, when the control signal φClip is a low level, the clip section 15 does not clip the voltage of the vertical signal line 21.

Moreover, the row selecting switch MLS of the row selecting switch section 14 is, for example, an nMOS transistor, and its source is connected to the input of the column amplifier 16, its drain is connected to the vertical signal line 21, and its gate receives the control signal φLSW. Here, the row selecting switch MLS disposed between the vertical signal line 21 and the column amplifier 16 becomes ON in a high level period of the control signal φLSW so as to output pixel signals transferred to the vertical signal line 21 to the input terminal of the column amplifier 16. Further, in a low level period of the control signal φLSW, since the row selecting switch MLS becomes OFF, pixel signals transferred to the vertical signal line 21 are not output to the column amplifier 16. Hereafter, the row selecting switch MLS is also referred to as a transistor MLS.

Returning now to FIG. 1, the accumulated signal selecting section 17 includes a set of an image signal selecting switch MS1 and a noise signal selecting switch MN1 for each column of the pixels PX of the pixel array 12. For example, the image signal selecting switch MS1 is an nMOS transistor, and its source is connected to an image signal accumulating section CS of the signal accumulating section 18, its drain is connected to an output of the column amplifier 16, and its gate receives the control signal φTS. Here, the image signal selecting switch MS1 becomes ON in a high level period of the control signal φTS so as to output signals which is input from the column amplifier 16 to the signal accumulating section 18.

Further, for example, the noise signal selecting switch MN1 is an nMOS transistor, and its source is connected to a noise signal accumulating section CN of the signal accumulating section 18, its drain is connected to an output of the column amplifier 16, and its gate receives the control signal φTN. Here, the noise signal selecting switch MN1 becomes ON in a high level period of the control signal φTN so as to output signals which is input from the column amplifier 16 to the signal accumulating section 18. Hereafter, the image signal selecting switch MS1 and the noise signal selecting switch MN1 are also referred to as transistors MS1 and MN1, respectively.

The signal accumulating section 18 includes a set of an image signal accumulating section CS and a noise signal accumulating section CN for each column of the pixels PX of the pixel array 12. For example, the image signal accumulating section CS is a capacity, and its one terminal is connected to the source of the transistor MS1, and its other terminal is grounded. Further, for example, the noise signal accumulating section CN is a capacity, and its one terminal is connected to the source of the transistor MN1, and its other terminal is grounded. Hereafter, the image signal accumulating section CS and the noise signal accumulating section CN are also referred to as capacities CS and CN, respectively.

The horizontal selecting switch section 19 includes a set of an image signal output switch MS2 and a noise signal output switch MN2 for each column of the pixels PX of the pixel array 12. For example, each of the image signal output switch MS2 and the noise signal output switch MN2 is an nMOS transistor. Hereafter, the image signal output switch MS2 and the noise signal output switch MN2 are also referred to as transistors MS2 and MN2 respectively.

For example, in the transistor MS2, the image signals OUTS are output from its source, its drain is connected to the source of the transistor MS1 and the one terminal of the capacity CS, and its gate receives the control signal φGH. Further, for example, in the transistor MN2, the noise signals OUTN are output from its source, its drain is connected to the source of the transistor MN1 and one terminal of the capacity CN, and its gate receives the control signal φGH. Here, the respective gates of the transistors MS2 and MN2 are connected to each other.

That is, the image signal output switch MS2 becomes ON in a high level period of the control signal φGH so as to output a voltage retained at the capacity CS as an image signal OUTS. Further, the noise signal output switch MN2 becomes ON in a high level period of the control signal φGH so as to output a voltage retained at the capacity CN as a noise signal OUTN. Here, the noise signal OUTN is, for example, an image signal (dark signal) right before the transfer transistor TX is opened after the pixel PX is reset by the reset transistor RST. Accordingly, for example, a fixed noise component and a reset noise component of the pixel contained in the image signal OUTS can be removed by subtracting the noise signal OUTN from the image signal OUTS.

The horizontal scan circuit 20 turns the transistor MS2 and MN2 ON sequentially by using the control signal φGH, and outputs sequentially the signals OUTS and OUTN retained respectively by the capacities CS and CN of the signal accumulating section 18. For example, at the time of outputting each of the image signal OUTS and the noise signal OUTN corresponding to the signal read out from the pixel PX on the m-th column, the horizontal scan circuit 20 controls the control signal φGH (m) to become a high level, and controls each of other control signals φGH to become a low level. Further, for example, at the time of outputting each of the image signal OUTS and the noise signal OUTN corresponding to the signal read out from the pixel PX on the (m+1)-th column, the horizontal scan circuit 20 controls the control signal φGH (m+1) to become a high level, and controls each of other control signals φGH to become a low level.

The imaging device controlling circuit 22 supplies a control signal to each of the vertical scan circuit 13, the row selecting switch section 14, the clip section 15, the accumulated signal selecting section 17, and the horizontal scan circuit 20.

In this connection, the above-mentioned control signal may be supplied from the controlling section of an imaging apparatus in which the solid state imaging device 11 of the first embodiment is mounted. In the above case, the imaging device controlling circuit 22 may be omitted from the solid state imaging device 11.

Figure 3:
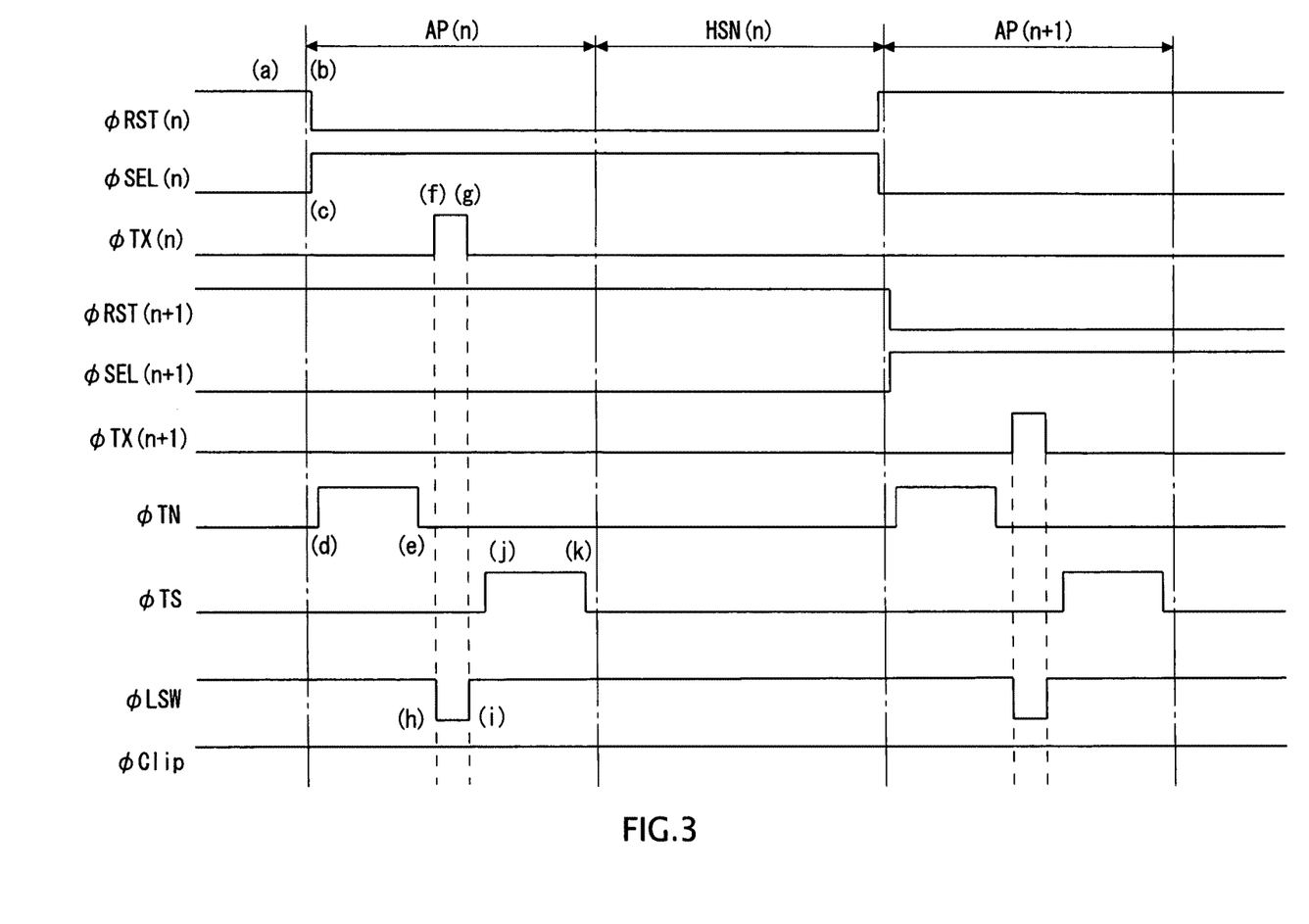
FIG. 3 is a diagram illustrating an operation example of the solid state imaging device according to the first embodiment.

Next, description is given to an operation example of each of the pixel PX, the row selecting switch section 14, and the clip section 15 in the solid state imaging device 11 in the first embodiment with reference to FIG. 3. Here, FIG. 3 shows an operation example at the time of reading out each of the image signal OUTS and the noise signal OUTN from each of the pixels PX on the n-th row of the pixel array 12 shown in FIG. 1.

For example, the vertical scan circuit 13 controls the control signals φRST, φSEL, and φTX in accordance with the instruction of the imaging device controlling circuit 22 as shown in FIG. 3, and makes each of the reset transistor RST, the selection transistor SEL, and the transfer transistor TX operate. Further, for example, the imaging device controlling circuit 22 controls the control signals φTN, φTS, φLSW, and φClip as shown in FIG. 3, and makes each of the transistors MS1, MN1, MLS, MC1, and MC2 operate.

Here, an access period AP is a period for accumulating the image signal OUTS and noise signal OUTN of each of the pixels PX in the capacities CS and CN of the signal accumulating section 18, respectively. Further, a horizontal scan period HSN is a period for outputting sequentially the image signal OUTS and the noise-signal OUTN accumulated respectively in the capacities CS and CN of the signal accumulating section 18. For example, the access period AP (n) and the horizontal scan period HSN (n) represent respectively the access period AP and the horizontal scan period HSN for reading out the image signals of the pixels PX on the n-th row.

Further, in the following description, the elements of each of the pixels PX on the n-th row may be referred to by adding "n" at the end of the reference sign. For example, the amplification transistor AMP of each of the pixels PX on the n-th row is also referred to as the amplification transistor AMPn.

Before shifting to the access period AP (n) of the pixels PX on the n-th row, the reset signal φRST (n) is maintained at a high level ((a) of FIG. 3), and the reset transistor RSTn is ON. That is, the voltage of the floating diffusion region FDn is reset to the initial state (hereafter, referred also to as a reset state) before shifting to the access period AP (n).

In the access periods AP (n), first, the reset signal φRST (n) changes from a high level to a low level ((b) of FIG. 3), and the reset transistor RSTn turns OFF. As a result, when the transfer transistor TXn turns ON, the floating diffusion region FDn can accumulate a signal electric charge from the photo diode PDn. Here, the voltage of the floating diffusion region FDn is maintained on the reset state until a signal electric charge is transferred from the photo diode PDn.

Next, the selection signal φSEL (n) changes from a low level to a high level ((c) of FIG. 3), and the selection transistor SELn turns ON. When the selection transistor SELn turns ON, a source follower circuit to output a signal from the source of the amplification transistor AMPn is configured. Thereby, the amplification transistor AMPn outputs a voltage corresponding to a voltage (a voltage in a reset state) of the floating diffusion region FDn to the vertical signal line 21 via the selection transistor SELn. Here, the voltage output to the vertical signal line 21 is inverted and amplified by the column amplifier 16.

Then, the control signal φTN changes from a low level to a high level ((d) of FIG. 3), and the transistor MN1 turns ON. Consequently, the signal (the noise signal OUTN shown in FIG. 1) corresponding to the reset state of the pixel PX on the n-th row is accumulated in the capacity CN of the signal accumulating section 18. Subsequently, the control signal φTN changes from the high level to a low level ((e) of FIG. 3(e)), and the transistor MN1 turns OFF. Thereby, the noise signal OUTN of the pixel PX on the n-th row is retained in the capacity CN. In this connection, in the period during which the control signal φTN is at a high level, the control signal φLSW is maintained at a high level.

After the control signal φTN has changed from a high level to a low level, the transfer signal φTX (n) changes from a low level to a high level ((f) of FIG. 3). Then, after a given period has elapsed, the transfer signal φTX (n) changes from a high level to a low level ((g) of FIG. 3). Consequently, the transfer transistor TXn keeps ON during a given period, and the signal electric charge generated by the photo diode PDn is transferred to the floating diffusion region FDn via the transfer transistor TXn. Then, a voltage corresponding to the voltage (the voltage of the capacity CFD in which the signal electric charge has been accumulated) of the floating diffusion region FDn is output from the amplification transistor AMPn to the vertical signal line 21 via the selection transistor SELn.

In the first embodiment, in a period during which the transfer signal φTX(n) is at a high level, the control signal φLSW is maintained at a low level ((h, i) of FIG. 3).

For example, when the transfer signal φTX (n) changes from a low level to a high level, the control signal φLSW changes from a high level to a low level ((h) of FIG. 3), and the row selecting transistor MLS turns OFF.

On the other hand, for example, when the transfer signal φTX (n) changes from a high level to a low level, the control signal φLSW changes from a low level to a high level ((i) of FIG. 3), and the row selecting transistor MLS turns ON.

Further, by the clip section 15, the voltage of the vertical signal line 21 is clipped so as not to lower than a predetermined value.

Here, in the drawings, the case where φClip is made constantly at a high level is exemplified. However, a pulse can be controlled according to a proposition. For example, two clipping circuits are prepared and configured such that, in one of the two clipping circuits the voltage of the vertical signal line is made constantly not to become a predetermined value or less as mentioned above, and in the other one, the clipping is made valid in a period during which φTN is at a high level. Thereby, a vertical signal line level at the time of reading out a noise signal is made not to become a prescribed voltage or less.

In this way, in a period during which the transfer signal φTX is at a high level, the row selecting transistor MLS becomes OFF, and the circuit between the vertical signal line 21 and the column amplifier 16 is made non-conductive. Further, after the transfer signal φTX (n) has returned to a low level, since the row selecting transistor MLS turns ON, the circuit between the vertical signal line 21 and the column amplifier 16 becomes conductive. Thereby, a desired voltage is input into the column amplifier 16. In this way, the desired voltage transferred to the vertical signal line 21 is input into the column amplifier 16 via the row selecting transistor MLS, and inverted and amplified by the column amplifier 16.

After the control signal φLSW has changed from a low level to a high level, the control signal φTS changes from a low level to a high level ((j) of FIG. 3), and the transistor MS1 turns ON. Consequently, a signal (the image signal OUTS shown in FIG. 1) corresponding to the signal electric charge generated by the photo diode PD of the pixel PX on the n-th row is accumulated in the capacity CS of the signal accumulating section 18. Subsequently, the control signal φTS changes from a high level to a low level ((k) of FIG. 3), and the transistor MS1 turns OFF. Thereby, the image signal OUTS of the pixel PX on the n-th row is retained in the capacity CS.

In the horizontal scan period HSN (n), the control signals φGH change to a high level sequentially. For example, when the horizontal scan circuit 20 changes the control signal φGH corresponding to the column of an output target to a high level, the horizontal scan circuit 20 changes each of the control signals φGH corresponding to the other columns to a low level. With this, the transistors MS2 and MN2 turn ON sequentially, and the signals OUTS and OUTN retained respectively in the capacities CS and CN of the signal accumulating section 18 are output sequentially.

Here, in the access period AP (n) and the horizontal scan period HSN (n), the control signals φRST, φSEL, and φTX other than the control signals φRST (n), φSEL (n), and φTX (n) are maintained at a high level, a low level, and a low level, respectively.

On the other hand, the control signals φRST (n+1), φSEL (n+1), and φTX (n+1) in the access period AP (n+1) are controlled in the same way as the control signals φRST (n), φSEL (n), and φTX (n) in the access period AP (n). In the access period AP (n+1) and the horizontal scan period HSN (n+1), the control signals φRST, φSEL, and φTX other than the control signals φRST (n+1), φSEL (n+1), and φTX (n+1) are maintained at a high level, a low level, and a low level, respectively. Here, in the access period AP (n+1), the operation of each of the control signals φTN, φTS, φLSW, and φClip is common to that of AP (n).

Hereafter, the operation and effect of the solid state imaging device 11 in the first embodiment is described.

First, as an assumption of the description, description is given to the principle based on which smear takes place on general CMOS type solid state imaging devices when high luminance light enters.

When high luminance light enters a certain pixel, the electric potential of the vertical signal line corresponding to the column of the pixel lowers. As a result, the constant current source of the vertical signal line in which the electric potential has lowered operates on a non-saturation region. Further, in the GND line of the constant current source, a current value lowers, and the amount of a voltage drop on the wiring resistance IR of the GND line of the constant current source becomes small (fluctuation of an IR drop). Then, a current larger than a usual current flows into the vertical signal line of each of the other columns. That is, in pixels located in the horizontal direction relative to the pixel which the high luminance light enters, a voltage between the gate and source of the amplification transistor in each of the pixels becomes large, and a voltage lower than a usual voltage is output. Accordingly, the corresponding image becomes brighter. As a result, streak-shaped noises (smear) take place in the horizontal direction of the pixel which the high luminance light has entered.

Here, as a comparative example of the present invention, the description is also given to the case where a clipping circuit is disposed at the output side of the row selecting transistor. In the configuration of the above comparative example, when the row selecting transistor becomes OFF in a period during which the transfer transistor is ON, the vertical signal line and the clipping circuit are blocked from each other. Therefore, in the above period, the voltage of the vertical signal line at the input side of the row selecting transistor is not clipped. Accordingly, if high luminance light enters a pixel, the electric potential of the vertical signal line lowers to the vicinity of GND.

In the configuration of the comparative example, after that, when the row selecting transistor turns ON from OFF, since the vertical signal line and the clipping circuit are connected to each other, the voltage of the vertical signal line returns to the clip voltage by the clipping circuit. However, in the comparative example, when the row selecting transistor becomes ON, an inrush current flows momentarily from the clipping circuit to the vertical signal line. Further, the current of the constant current source connected to the vertical signal line also returns to the usual current value.

Therefore, in the comparative example, when high luminance light enters a pixel, it is understood that a smear in the horizontal direction relatively tends to take place. Further, in the comparative example, the voltage of the vertical signal line fluctuates greatly due to ON and OFF of the row selecting transistor, and a period of time until the output level of the column amplifier statically settles becomes long. For example, in reading out a signal at a high speed with the configuration of the comparative example, the above smear occurs more frequently.

On the other hand, in the solid state imaging device 11 of the first embodiment, the row selecting transistor MLS becomes OFF in a period during which the transfer transistor TX is ON, and the circuit between the vertical signal line 21 and the column amplifier 16 is made non-conductive. However, in the first embodiment, in the above period, the voltage of the vertical signal line 21 from the pixel PX to the input side of the row selecting transistor MLS is clipped to a predetermined value by the clip section 15. Therefore, in the solid state imaging device 11 of the first embodiment, when high luminance light enters a pixel PX, since the voltage of the vertical signal line 21 connected to the pixel PX does not lower than the clipped voltage, it becomes possible to suppress the occurrence of the smear in a horizontal direction effectively. Further, in the first embodiment, in a period during which the transfer transistor TX is ON, also, the clip section 15 functions effectively. Accordingly, when the row selecting transistor MLS turns ON from OFF, a period of time until the output level of the column amplifier 16 statically settles becomes short. Therefore, in the first embodiment, it becomes comparatively easy to read out signals at high speed while suppressing the occurrence of smear.

<Description of a Second Embodiment>

Figure 4:
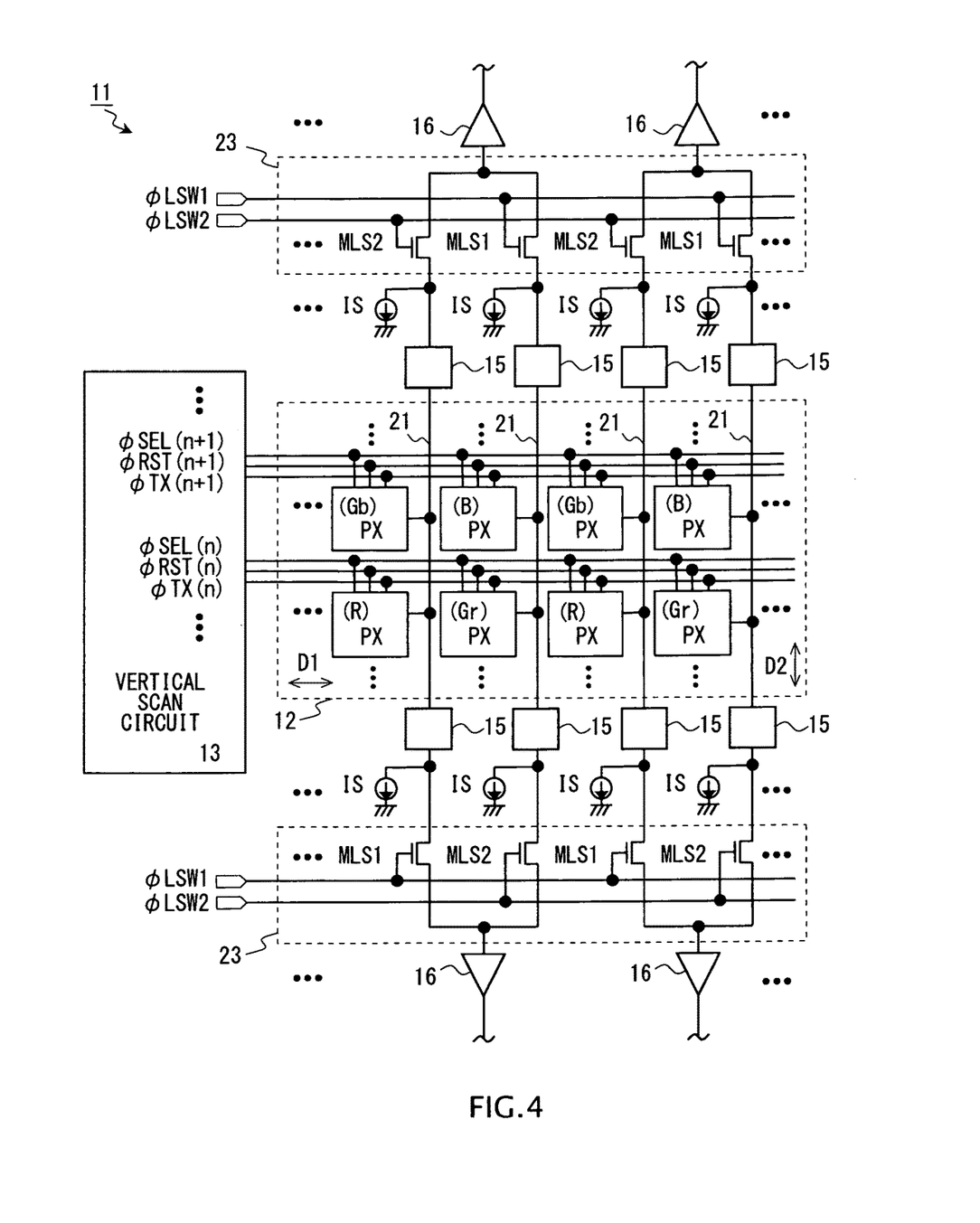
FIG. 4 is a block diagram illustrating a configuration example of a solid state imaging device according to a second embodiment.

FIG. 4 illustrates an outline of a solid state imaging device in the second embodiment. The solid state imaging device of the second embodiment is a modification example of the first embodiment, in which a signal read-out circuit is disposed at each of the both sides (upper and lower) of the pixel array 12.

Here, in the solid state imaging device 11 of the second embodiment, a line selector 23 is disposed in place of the row selecting switch section 14 illustrated in FIG. 1. Further, in FIG. 4, an illustration of each of elements (the accumulated signal selecting section 17, the signal accumulating section 18, the horizontal selecting switch section 19, and the horizontal scan circuit 20) disposed on the latter stage of the amplifying section and the imaging device controlling circuit 22 is omitted. Here, in the second embodiment, each of the elements common to those in the first embodiment is provided with the same sign, and duplication description for each of them is omitted.

The line selector 23 is a switch which switches over pixel signals in a pair of an odd number column and an even number column being adjacent to each other on the pixel array 12. The line selector 23 is disposed at each of one end side (the lower side in the drawing) and the other end side (the upper side in the drawing) in the column direction D2 in the pixel array 12. For example, each of the line selectors 23 disposed between the vertical signal line 21 and the column amplifier 16 includes a row selecting switch MLS1 and a row selecting switch MLS2. For example, each of the row selecting switch MLS1 and MSL2 is an nMOS transistor, and their gates receive the control signals LSW1 and LSW2, respectively. Hereafter, the row selecting switches MLS1 and MLS2 are also referred to as row selecting transistors MLS1 and MLS2, respectively.

For example, in the line selector 23 located at the lower side of the pixel array 12, the source of each of a pair of the row selecting transistors MLS1 and MLS2 is connected to the input of the common column amplifier 16. Further, for example, the drains of the row selecting transistors MLS1 and MSL2 located at the lower side of the pixel array 12 are connected to the vertical signal line 21 of an odd number column and the vertical signal line 21 of an even number column, respectively.

On the other hand, for example, in the line selector 23 located at the upper side of the pixel array 12, the source of each of a pair of the row selecting transistors MLS1 and MLS2 is connected to the input of the common column amplifier 16. Further, for example, the drains of the row selecting transistors MLS1 and MSL2 located at the upper side of the pixel array 12 are connected to the vertical signal line 21 of an even number column and the vertical signal line 21 of an odd number column, respectively.

Here, each of the row selecting transistors MLS1 and MLS2 of the line selector 23 functions as a connecting switch to switch over conduction and non-conduction between the vertical signal line 21 and the column amplifier 16.

The column amplifier 16 in this embodiment is disposed at each of the both sides (the upper side and the lower side in FIG. 4) of the pixel array 12 in the column direction D2. The column amplifier 16 disposed at the lower side of the pixel array 12 receives a signal from the line selector 23 positioned at the lower side of the pixel array 12, and the column amplifier 16 disposed at the upper side of the pixel array 12 receives a signal from the line selector 23 positioned at the upper side of the pixel array 12. Further, in the row direction D1 of the pixel array 12, one piece of the column amplifiers 16 is disposed for every two columns of the pixel array 12. That is, one of the column amplifiers 16 is disposed on the width corresponding to two columns of the pixels. Accordingly, even when the pixel pitch is reduced due to the tendency to increase the number of pixels, it becomes possible to secure a layout space for the column amplifiers 16.

Further, in this embodiment, the clip section 15, the accumulated signal selecting section 17, the signal accumulating section 18, the horizontal selecting switch section 19, the horizontal scan circuit 20, and the constant current source IS are disposed separately at each of the upper side and the lower side of the pixel array 12. The clip section 15 and the constant current source IS are disposed at each of the upper and lower sides of the pixel array 12 for each of the vertical signal lines 21. In this embodiment, since the clip section 15 and the constant current source IS are disposed at each of the upper and lower sides of the pixel array 12, the vertical symmetric property of an image is be maintained. Here, the configuration of each of the accumulated signal selecting section 17, the signal accumulating section 18, the horizontal selecting switch section 19, and the horizontal scan circuit 20 is the same as that in the above-mentioned first embodiment.

Figure 5:
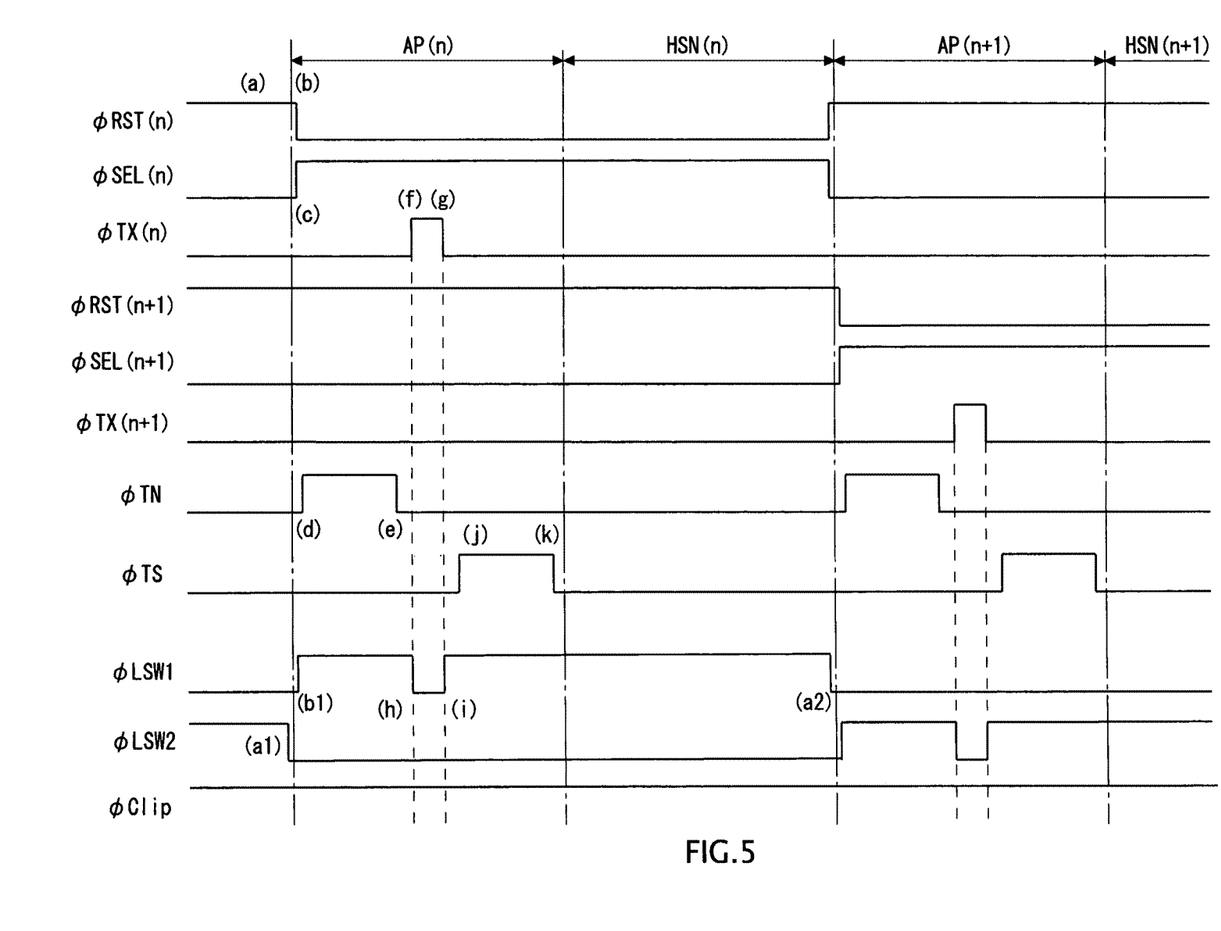
FIG. 5 is a diagram illustrating an operation example of the solid state imaging device according to the second embodiment.

FIG. 5 shows an operation example of the solid state imaging device 11 in the second embodiment. FIG. 5 shows the operation of the solid state imaging device 11 at the time of reading out each of the image signal OUTS and the noise signal OUTN from each of pixels on the n-th row of the pixel array 12 shown in FIG. 4 mentioned above. Here, the operation shown in FIG. 5 is the same as the operation shown in FIG. 3 mentioned above except the operation of the control signal LSW (LSW1, LSW2).

Before shifting to the access period AP (n) of the pixels on the n-th row, the reset signal φRST(n) is maintained at a high level ((a) of FIG. 5), and the control signal φLSW1 is maintained at a low level. Further, before shifting to the access period AP (n), the control signal φLSW2 changes from a high level to a low level ((a1) of FIG. 5), and the row selecting transistor MLS2 turns OFF.

In the access period AP (n), the control signal φLSW1 changes from a low level to a high level ((b1) of FIG. 5), and the control signal φTN changes from a low level to a high level ((d) of FIG. 5). That is, the row selecting transistor MLS1 and the transistor MN1 turn ON. As a result, the noise signal OUTN of the red pixel (R) on the n-th row is accumulated in the capacity CN of the signal accumulating section 18 disposed at the lower side of the pixel array 12. Further, the noise signal OUTN of the green pixel (Gr) on the n-th row is accumulated in the capacity CN of the signal accumulating section 18 disposed at the upper side of the pixel array 12.

Then, when the transfer signal φTX (n) changes from a low level to a high level ((f) of FIG. 5), the control signal φLSW1 changes from a high level to a low level ((h) of FIG. 5), and the row selecting transistor MLS1 turns OFF. Further, for example, when the transfer signal φTX (n) changes from a high level to a low level ((g) of FIG. 5), the control signal φLSW1 changes from a low level to a high level ((i) of FIG. 5), and the row selecting transistor MLS1 turns ON. Here, in the access period AP (n) and the horizontal scan period HSN (n), the control signal φLSW2 is maintained at a low level. That is, in a period during which the transfer signal φTX(n) is at a high level, the control signals φLSW1 and ϕLSW2 are maintained at a low level, and both of the row selecting transistors MLS1 and MLS2 turn OFF.

In this way, also in this embodiment, in a period during which the transfer signal φTX (n) is at a high level, a circuit between the vertical signal line 21 and the column amplifier 16 is made non-conductive. Accordingly, in this embodiment, it becomes possible to prevent a voltage rise of the vertical signal line due to the feed through of the transfer signal ΦTX (n) of a high level from being transmitted to the column amplifier 16. Further, after the transfer signal φTX (n) has returned to a low level, since the row selecting transistor MLS1 turns ON, a circuit between the vertical signal line 21 and the column amplifier 16 is made conductive. Thereby, a desired voltage is input into the column amplifier 16.

For example, a signal corresponding to the signal electric charge generated by the photo diode PD of the red pixel (R) on the n-th row is input into the column amplifier 16 disposed at the lower side of the pixel array 12 via the row selecting transistor MLS1, and then the signal is inverted and amplified by the column amplifier 16. Further, for example, a signal corresponding to the signal electric charge generated by the photo diode PD of the green pixel (Gr) on the n-th row is input into the column amplifier 16 disposed at the upper side of the pixel array 12 via the row selecting transistor MLS1, and then the signal is inverted and amplified by the column amplifier 16.

When the transfer signal ϕTX (n) has changed from a low level to a high level, the control signal ϕLSW1 changes from a high level to a low level ((h) of FIG. 5), and the row selecting transistor LSW1 turns OFF.

Further, by the clip section 15, the voltage of the vertical signal line 21 is clipped so as not to lower than a predetermined value.

After the control signal ϕLSW1 has changed from a low level to a high level, the control signal ϕTS changes from a low level to a high level ((j) of FIG. 5), and the transistor MS1 of the accumulated signal selecting section 17 turns ON. As a result, the image signal OUTS of the red pixel (R) on the n-th row is accumulated in the capacity CS of the signal accumulating section 18 disposed at the lower side of the pixel array 12. Further, the image signal OUTS of the green pixel (Gr) on the n-th row is accumulated in the capacity CS of the signal accumulating section 18 disposed at the upper side of the pixel array 12.

In the horizontal scan period HSN (n), the signals OUTS and OUTN of the red pixel (R) on the n-th row are output sequentially from the signal accumulating section 18 disposed at the lower side of the pixel array 12 via the horizontal selecting switch section 19. Further, the signals OUTS and OUTN of the green pixel (Gr) on the n-th row are output sequentially from the signal accumulating section 18 disposed at the upper side of the pixel array 12 via the horizontal selecting switch section 19. Here, the control signal ϕLSW1 changes from a high level to a low level before shifting to the access period AP (n+1) of the pixel on the (n+1)-th row ((a2) of FIG. 5).

Here, in the access period AP (n) and the horizontal scan period HSN (n), the control signals ϕRST, ϕSEL, and ϕTX other than the control signals ϕRST (n), ϕSEL (n), and ϕTX (n) are maintained at a high level, a low level, and a low level, respectively.

On the other hand, the control signal ϕRST (n+1), ϕSEL (n+1), ϕTX (n+1), and ϕLSW2 in the access period AP (n+1) are controlled in the same way as the control signals ϕRST (n), ϕSEL (n), ϕTX (n), and ϕLSW1 in the access periods AP (n). In the access period AP (n+1) and the horizontal scan period HSN (n+1), the control signals ϕRST, ϕSEL, and ϕTX other than the control signals ϕRST (n+1), ϕSEL (n+1), and ϕTX (n+1) are maintained at a high level, a low level, and a low level, respectively. In the access period AP (n+1) and the horizontal scan period HSN (n+1), the control signal ϕLSW1 is maintained at a low level. Here, in the access period AP (n+1), the operation of each of the control signals ϕTN, ϕTS, ϕLSW, and ϕClip is common to that of AP (n).

That is, in the access period AP (n+1), the control signal ϕLSW2 is controlled in the same way as the control signal ϕLSW1 in the access periods AP (n). Accordingly, in the horizontal scan period HSN (n+1), the signals OUTS and OUTN of the blue pixel (B) on the (n+1)-th row are output sequentially from the signal accumulating section 18 disposed at the lower side of the pixel array 12 via the horizontal selecting switch section 19. Further, in the horizontal scan period HSN (n+1), the signals OUTS and OUTN of the green pixel (Gb) on the (n+1)-th row are output sequentially from the signal accumulating section 18 disposed at the upper side of the pixel array 12 via the horizontal selecting switch section 19.

As mentioned above, in the solid state imaging device 11 of the second embodiment, in a period during which at least the transfer signal ϕTX is at a high level, both of the control signals LSW1 and LSW2 are maintained at a low level; and in addition, the voltage of the vertical signal line 21 is clipped by the clip section 15 so as not to lower than a predetermined value. Therefore, in the second embodiment, also, the same effects as the first embodiment mentioned above can be acquired.

Here, in the second embodiment, when focusing attention on a certain vertical signal line 21, the signal read-out for an odd number column and the signal read-out for an even number column can be switched over for every row by the control of the row selecting transistors MLS1 and MLS2. As a result, for example, the signals from the green pixel (Gr, Gb) can be read out via the column amplifier 16 disposed at the upper side of the pixel array 12, and for example, the signals from the red pixel (R) and the blue pixel (B) can be read out via the column amplifier 16 disposed at the lower side of the pixel array 12. For this reason, in this embodiment, a level difference between the respective signals of the green pixel (Gr) and the green pixel (Gb) can be made small.

<Configuration Example of an Imaging Apparatus>

Figure 6:
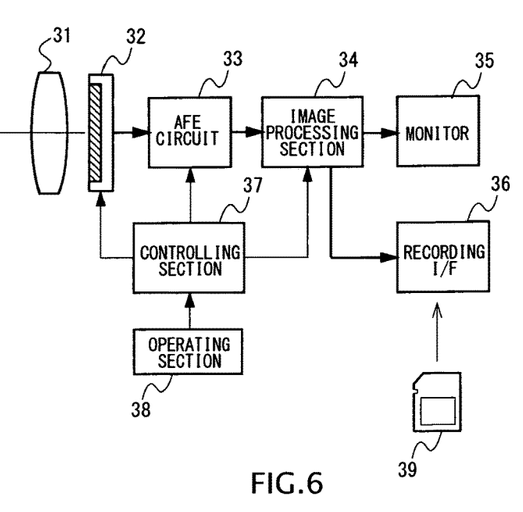
FIG. 6 is a diagram illustrating a configuration example of an imaging apparatus.

FIG. 6 is a diagram illustrating a configuration example of an electronic camera being an example of imaging apparatuses.

The electronic camera includes an imaging optical system 31, the solid state imaging device 32 of the above-mentioned first embodiment or second embodiment, an analog front end circuit 33 (AFE circuit), an image processing section 34, a monitor 35, a recording I/F 36, a controlling section 37, and an operating section 38. Here, each of the solid state imaging device 32, the analog front end circuit 33, the image processing section 34, and the operating section 38 are connected to the controlling section 37.

The imaging optical system 31 is configured by a plurality of lenses including, for example, a zoom lens and a focus lens. Here, for the purpose of simplification, in FIG. 6, the imaging optical system 31 is illustrated with a single lens.

The solid state imaging device 32 photographs a focused image of a photographic subject with a light flux having passed through the imaging optical system 31. The output of the imaging device is connected to the analog front end circuit 33.

In the photographing mode of the electronic camera, the solid state imaging device 32 photographs a recording still image and video image with a process of recording into a nonvolatile storage medium (39) in response to an input on the operating section 38. Further, the solid state imaging device 32 photographs images (through images) for observation continuously for every predetermined intervals even at the waiting time for photographing a recording still image. The data of the through images acquired in time series (or, the data of the above-mentioned video image) are used for the video display in the monitor 35, or for various kinds of arithmetic processing by the controlling section 37. Here, at the time of photographing video images, the electronic camera may record through images.

The analog front end circuit 33 is a circuit applying analog signal processing and A/D conversion processing sequentially to image signals input in a form of pipeline. The output of the analog front end circuit 33 is connected to the image processing section 34.

The image processing section 34 performs image processing (color interpolation processing, tone-conversion processing, contour enhancement processing, white balance adjustment, etc.) to the digital image signal input from the analog front end circuit 33. Here, to the image processing section 34, the monitor 35 and the recording I/F 36 are connected.

The monitor 35 is a display device displaying various kinds of images. For example, the monitor 35 performs the video display (viewfinder display) of the through images under the photographing mode by the control of the controlling section 37.

The recording I/F 36 includes a connector for connecting the nonvolatile storage medium 39. Then, the recording I/F 36 performs writing and/or reading data to/from the storage medium 39 connected to the connector. The above-mentioned storage medium 39 is configured by a hard disk, a memory card which incorporates a semiconductor memory, and the like. Here, in FIG. 6, a memory card is illustrated as an example of the storage medium 39.

The controlling section 37 is a processor which generally controls the operation of the electronic camera. The operating section 38 receives an acquisition instruction (for example, a fully-pressing operation for a release button) of a recording still image from a user.

Since the above-mentioned electronic camera uses the solid state imaging device 32 of the first embodiment or the second embodiment, for example, at the time of continuous shooting of still images or at the time of photographing a video image, it becomes possible to suppress the occurrence of smear when a high luminance photographic subject is photographed.

<Supplementary Matters of the Embodiments>

(Supplement 1): In the first embodiment, description is given to an example where image signals are read out from one end side of the pixel array 12. However, in the first embodiment, image signals may be read out from both ends of the pixel array 12. For example, in the first embodiment, a set of the row selecting switch section 14, the column amplifier 16, the accumulated signal selecting section 17, the signal accumulating section 18, the horizontal selecting switch section 19, and the horizontal scan circuit 20 may be disposed at each of the both end sides of the pixel array 12 in the column direction D2. In this case, for example, the image signals of an odd number column may be read out from the upper side of the pixel array 12, and the image signals of an even number column may be read out from the lower side of the pixel array 12, (here, an illustration of a configuration example of Supplement 1 is omitted).

(Supplement 2): In the above-mentioned embodiments, the description is given to an example in which one pixel is configured by four transistors. However, in the solid state imaging device of the present invention, the reset transistor RST, the amplification transistor AMP, and the selection transistor SEL may be shared among a plurality of pixels (for example, a 2.5 Tr configuration having five transistors for 2 pixels or a 1.75 Tr configuration having seven transistors for 4 pixels).

Figure 7:
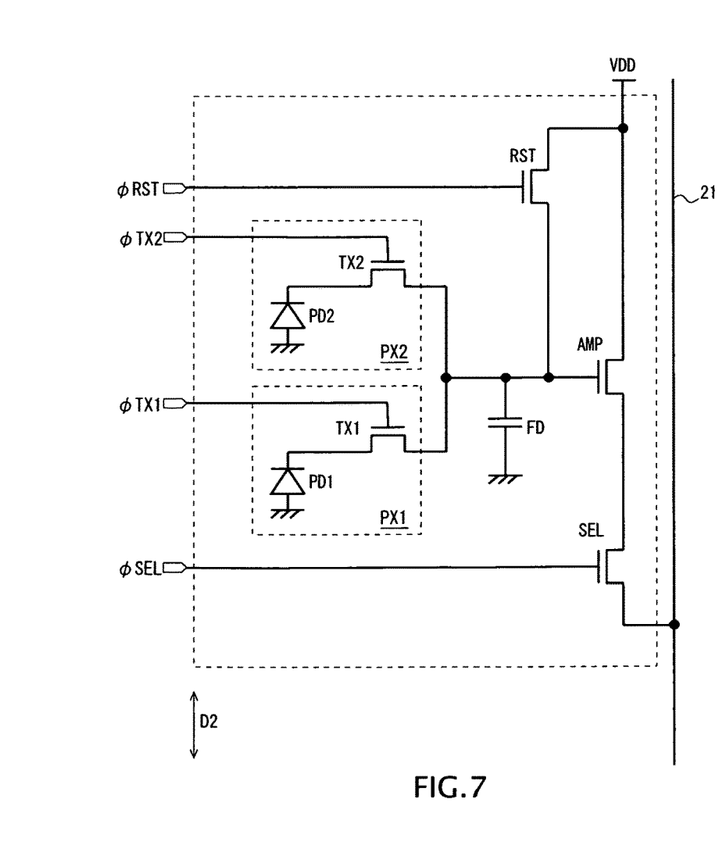
FIG. 7 is a diagram illustrating a modification example of a pixel.

FIG. 7 shows a modification example of a pixel PX. The configuration of a pixel PX shown in FIG. 7 is the same as the configuration of the above-mentioned pixel PX shown in FIG. 2 except that the amplification transistor AMP, the selection transistor SEL, the reset transistor RST, and the floating diffusion region FD are shared by two pixels (PX1 to PX2) adjacent to each other in the column direction D2 of the pixel array 12. Here, in the pixel PX shown in FIG. 7, a plurality of floating diffusion regions FD adjacent to each other in the column direction D2 may be connected with switches so as to enable addition readout in the column direction D2 (illustration for this case is omitted).

Figure 8:
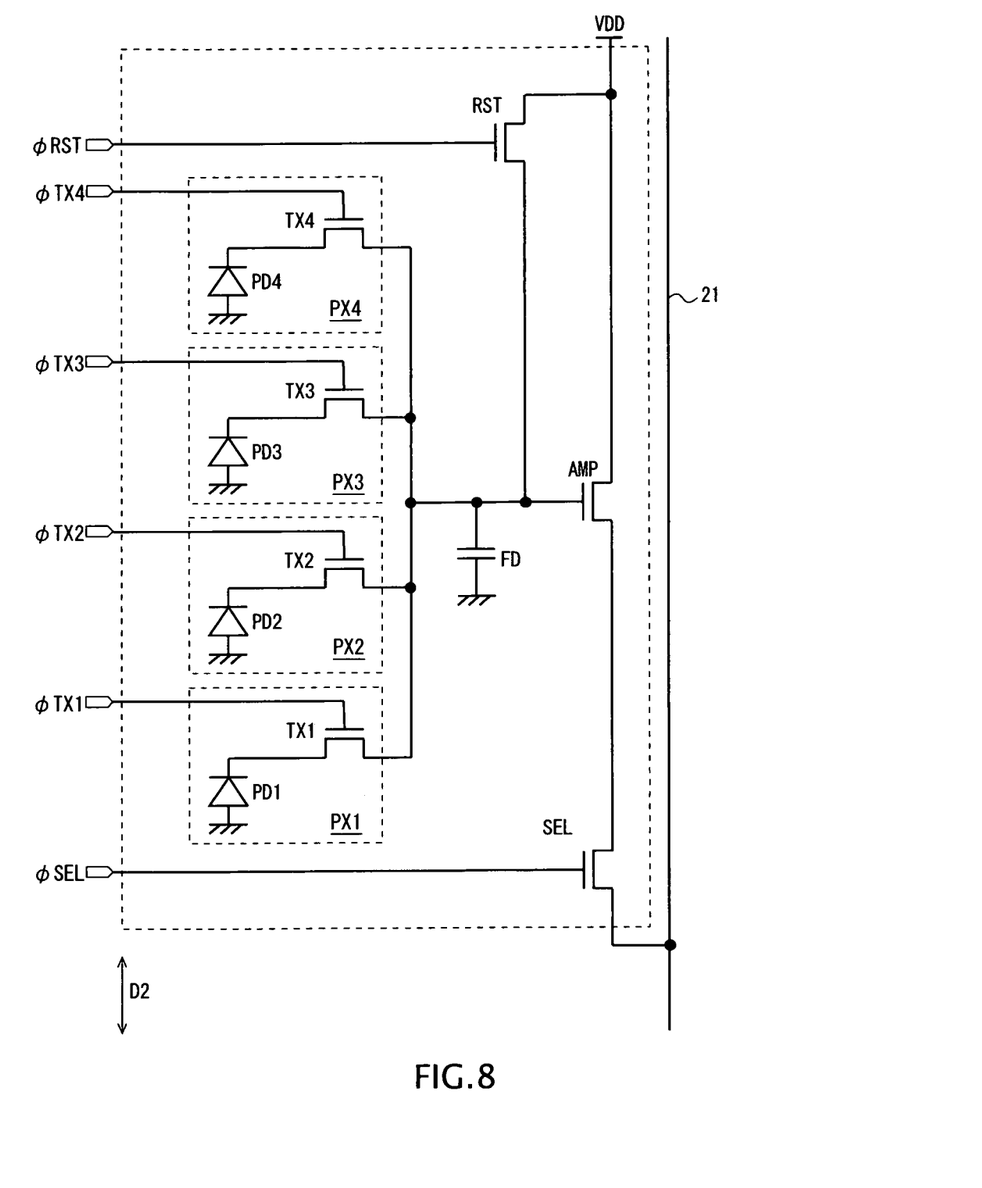
FIG. 8 is a diagram illustrating a modification example of a pixel.

FIG. 8 shows a modification example of a pixel PX. The configuration of a pixel PX shown in FIG. 8 is the same as the configuration of the above-mentioned pixel PX shown in FIG. 2 except that the amplification transistor AMP, the selection transistor SEL, the reset transistor RST, and the floating diffusion region FD are shared by four pixels (PX1 to PX4) adjacent to each other in the column direction D2 of the pixel array 12.

(Supplement 3): In the above-mentioned embodiment, the description is given to the configuration of the electronic camera as an example of the imaging apparatuses. However, in the imaging apparatus of the present invention, the solid state imaging device and various kinds of signal processing circuits may be integrated in the configuration of on-chip.

(Supplement 4): In the above-mentioned embodiment, the color filter array of the solid state imaging device may be another color filter array (for example, complementary color system color filters employing magenta, green, cyan, and yellow) without being limited to the Bayer array.

(Supplement 5): In the above-mentioned embodiment, the description is given to the configuration that the solid state imaging device outputs signals OUTS and OUTN as analog signals without changing in the horizontal scan circuit. However, the solid state imaging device of the present invention may be made in a column ADC system in which an AD converter is disposed for each of the column amplifiers 16 so as to make a digital output. In this case, in the imaging apparatus, in place of the analog front end AFE 33, a digital front end DFE may be disposed.

(Supplement 6): In the second embodiment, the description is given to the configuration that Gr and Gb are output without fail via the column amplifier 16 of one side (for example, the upper side) by switching over the line selector 23 for each row. However, by fixing the connecting direction of the line selection, it may be configured that, for example, R and Gb are output via the column amplifier at the lower side, and Gr and B are output via the column amplifier at the upper side.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to exact construction and operation illustrated and described, and accordingly all suitable modifications and equivalents may be resorted to, falling within the scope thereof.

The invention claimed is:

1. An imaging device, comprising:
a plurality of first pixels, each first pixel including a first photoelectric conversion unit which converts light into electric charge, a first transfer unit which transfers the electric charge of the first photoelectric conversion unit to a first floating diffusion region, and a first output unit which outputs to a first signal line a first signal generated from the electric charge transferred to the first floating diffusion region from the first photoelectric conversion unit by the first transfer unit;
a plurality of second pixels, each second pixel including a second photoelectric conversion unit which converts light into electric charge, a second transfer unit which transfers the electric charge of the second photoelectric conversion unit to a second floating diffusion region, and a second output unit which outputs to a second signal line a second signal generated from the electric charge transferred to the second floating diffusion region from the second photoelectric conversion unit by the second transfer unit;
a signal processing unit having a terminal being input the first signal output to the first signal line and the second signal output to the second signal line and performing signal processing on the first signal and the second signal input to the terminal;
a first controlling unit, disposed between the first signal line and the terminal, causing the first signal line and the terminal to be non-conductive;
a second controlling unit, disposed between the second signal line and the terminal, causing the second signal line and the terminal to be non-conductive;
a first voltage adjusting unit, connected between the first pixel and the first controlling unit in the first signal line, adjusting a voltage of the first signal line not to become a predetermined value or less;
a second voltage adjusting unit, connected between the second pixel and the second controlling unit in the second signal line, adjusting a voltage of the second signal line not to become the predetermined value or less; and
a controlling circuit controlling each of the first controlling unit, the second controlling unit, the first voltage adjusting unit, and the second voltage adjusting unit, wherein
the controlling circuit controls
the first controlling unit in order to cause the first signal line and the terminal to be non-conductive in a period in which the electric charge is transferring to the first floating diffusion region from the first photoelectric conversion unit by the first transfer unit,
the second controlling unit in order to cause the second signal line and the terminal to be non-conductive in a period in which the electric charge is transferring to the second floating diffusion region from the second photoelectric conversion unit by the second transfer unit,
the first voltage adjusting unit in order for the voltage of the first signal line not to become the predetermined value or less in a period in which the first signal line and the terminal are to be non-conductive by the first controlling unit, and
the second voltage adjusting unit in order for the voltage of the second signal line not to become the predetermined value or less in a period in which the second signal line and the terminal are to be non-conductive by the second controlling unit;
the first voltage adjusting unit includes a first clipping circuit being connected to the first signal line and adjusting the voltage of the first signal line not to become the predetermined value or less and includes a second clipping circuit being connected to the first signal line and adjusting the voltage of the first signal line not to become the predetermined value or less;
the second voltage adjusting unit includes a third clipping circuit being connected to the second signal line and adjusting the voltage of the second signal line not to become the predetermined value or less and includes a fourth clipping circuit being connected to the second signal line and adjusting the voltage of the second signal line not to become the predetermined value or less;
a first pixel connected to the first signal line and adjusted by the first clipping circuit in order for the voltage of the first signal line not to become the predetermined value or less is different from another first pixel connected to the first signal line and adjusted by the second clipping circuit in order for the voltage of the first signal line not to become the predetermined value or less;
a second pixel connected to the second signal line and adjusted by the third clipping circuit in order for the voltage of the second signal line not to become the predetermined value or less is different from another second pixel connected to the second signal line and adjusted by the fourth clipping circuit in order for the voltage of the second signal line not to become the predetermined value or less;
the first clipping circuit is located on the first signal line between a point where an output of the first pixel adjusted by the first clipping circuit is connected to the first signal line and a point where a first constant current source is connected to the first signal line;
the second clipping circuit is located on the first signal line between a point where an output of the another first pixel adjusted by the second clipping circuit is connected to the first signal line and a point where a second constant current source is connected to the first signal line;
the third clipping circuit is located on the second signal line between a point where an output of the second pixel adjusted by the third clipping circuit is connected to the second signal line and a point where a third constant current source is connected to the second signal line; and
the fourth clipping circuit is located on the second signal line between a point where an output of the another second pixel adjusted by the fourth clipping circuit is connected to the second signal line and a point where a fourth constant current source is connected to the second signal line.

2. The imaging device according to claim 1, wherein the signal processing unit includes an operational amplifier amplifying each of the first signal input to the terminal and the second signal input to the terminal.

3. The imaging device according to claim 1, wherein:
each of the first transfer unit and the second transfer unit is controlled by the controlling circuit; and
the controlling circuit controls
the first voltage adjusting unit in order for the voltage of the first signal line not to become the predetermined value or less in the period in which the electric charge is transferring to the first floating diffusion region from the first photoelectric conversion unit by the first transfer unit, and the second voltage adjusting unit in order for the voltage of the second signal line not to become the predetermined value or less in the period in which the electric charge is transferring to the second floating diffusion region from the second photoelectric conversion unit by the second transfer unit.

4. The imaging device according to claim 1, wherein:

each of the first transfer unit and the second transfer unit is controlled by the controlling circuit; and the controlling circuit controls the first controlling unit in order to cause the first signal line and the terminal to be conductive after the electric charge is transferred to the first floating diffusion region from the first photoelectric conversion unit by the first transfer unit, and the second controlling unit in order to cause the second signal line and the terminal to be conductive after the electric charge is transferred to the second floating diffusion region from the second photoelectric conversion unit by the second transfer unit.

5. The imaging device according to claim 1, wherein the first pixel and the second pixel each include a filter having a same spectral sensitivity, and light from the filter is incident on the first photoelectric conversion unit and the second photoelectric conversion unit.

6. The imaging device according to claim 1, wherein the first floating diffusion region is electrically connected to the second floating diffusion region.

7. An imaging apparatus, comprising:

the imaging device according to claim 1.

8. The imaging device according to claim 1, wherein the first signal line is connected with a plurality of first voltage adjusting units, and the second signal line is connected with a plurality of second voltage adjusting units.

9. The imaging device according to claim 1, wherein the first controlling unit causes the first signal line and the terminal to be conductive in the period in which the second signal line and the terminal are to be non-conductive by the second controlling unit, and the second controlling unit causes the second signal line and the terminal to be conductive in the period in which the first signal line and the terminal are to be non-conductive by the first controlling unit.

10. An imaging device, comprising:

a first transfer unit transferring to a first floating diffusion region electric charge of a first photoelectric conversion unit which converts light into the electric charge transferred to the first floating diffusion region;

a second transfer unit transferring to a second floating diffusion region electric charge of a second photoelectric conversion unit which converts light into the electric charge transferred to the second floating diffusion region;

a first signal line outputting a first signal generated from the electric charge transferred to the first floating diffusion region from the first photoelectric conversion unit by the first transfer unit;

a second signal line outputting a second signal generated from the electric charge transferred to the second floating diffusion region from the second photoelectric conversion unit by the second transfer unit;

a signal processing unit having a terminal being input the first signal output to the first signal line and the second signal output to the second signal line, and performing signal processing on the first signal and the second signal input to the terminal;

a first controlling unit, disposed between the first signal line and the terminal, causing the first signal line and the terminal to be non-conductive;

a second controlling unit, disposed between the second signal line and the terminal, causing the second signal line and the terminal to be non-conductive;

a first voltage adjusting unit, connected between the first pixel and the first controlling unit in the first signal line, adjusting a voltage of the first signal line not to become a predetermined value or less;

a second voltage adjusting unit, connected between the second pixel and the second controlling unit in the second signal line, adjusting a voltage of the second signal line not to become the predetermined value or less; and a controlling circuit controlling each of the first controlling unit, the second controlling unit, the first voltage adjusting unit, and the second voltage adjusting unit, wherein the controlling circuit controls the first controlling unit in order to cause the first signal line and the terminal to be non-conductive in a period in which the electric charge is transferring to the first floating diffusion region from the first photoelectric conversion unit by the first transfer unit, the second controlling unit in order to cause the second signal line and the terminal to be non-conductive in a period in which the electric charge is transferring to the second floating diffusion region from the second photoelectric conversion unit by the second transfer unit, the first voltage adjusting unit in order for the voltage of the first signal line not to become the predetermined value or less in a period in which the first signal line and the terminal are to be non-conductive by the first controlling unit, and the second voltage adjusting unit in order for the voltage of the second signal line not to become the predetermined value or less in a period in which the second signal line and the terminal are to be non-conductive by the second controlling unit;

the first voltage adjusting unit includes a first clipping circuit being connected to the first signal line and adjusting the voltage of the first signal line not to become the predetermined value or less and includes a second clipping circuit being connected to the first signal line and adjusting the voltage of the first signal line not to become the predetermined value or less;

the second voltage adjusting unit includes a third clipping circuit being connected to the second signal line and adjusting the voltage of the second signal line not to become the predetermined value or less and includes a fourth clipping circuit being connected to the second signal line and adjusting the voltage of the second signal line not to become the predetermined value or less;

a first pixel connected to the first signal line and adjusted by the first clipping circuit in order for the voltage of the first signal line not to become the predetermined value or less is different from another first pixel connected to the first signal line and adjusted by the second clipping circuit in order for the voltage of the first signal line not to become the predetermined value or less;

a second pixel connected to the second signal line and adjusted by the third clipping circuit in order for the voltage of the second signal line not to become the predetermined value or less is different from another second pixel connected to the second signal line and adjusted by the fourth clipping circuit in order for the voltage of the second signal line not to become the predetermined value or less;

the first clipping circuit is located on the first signal line between a point where an output of the first pixel adjusted by the first clipping circuit is connected to the first signal line and a point where a first constant current source is connected to the first signal line;

the second clipping circuit is located on the first signal line between a point where an output of the another first pixel adjusted by the second clipping circuit is connected to the first signal line and a point where a second constant current source is connected to the first signal line;

the third clipping circuit is located on the second signal line between a point where an output of the second pixel adjusted by the third clipping circuit is connected to the second signal line and a point where a third constant current source is connected to the second signal line; and the fourth clipping circuit is located on the second signal line between a point where an output of the another second pixel adjusted by the fourth clipping circuit is connected to the second signal line and a point where a fourth constant current source is connected to the second signal line.

11. The imaging device according to claim 10, wherein the signal processing unit includes an operational amplifier amplifying each of the first signal input to the terminal and the second signal input the terminal.

12. The imaging device according to claim 10, wherein:
each of the first transfer unit and the second transfer unit is controlled by the controlling circuit; and
the controlling circuit controls
the first voltage adjusting unit in order for the voltage of the first signal line not to become the predetermined value or less in the period in which the electric charge is transferring to the first floating diffusion region from the first photoelectric conversion unit by the first transfer unit; and
the second voltage adjusting unit in order for the voltage of the second signal line not to become the predetermined value or less in the period in which the electric charge is transferring to the second floating diffusion region from the second photoelectric conversion unit by the second transfer unit.

13. The imaging device according to claim 10, wherein:
each of the first transfer unit and the second transfer unit is controlled by the controlling circuit; and
the controlling circuit controls
the first controlling unit in order to cause the first signal line and the terminal to be conductive after the electric charge is transferred to the first floating diffusion region from the first photoelectric conversion unit by the first transfer unit, and
the second controlling unit in order to cause the second signal line and the terminal to be conductive after the electric charge is transferred to the second floating diffusion region from the second photoelectric conversion unit by the second transfer unit.

14. The imaging device according to claim 10, wherein the first photoelectric conversion unit and the second photoelectric conversion unit each include a filter having a same spectral sensitivity, and
light from the filter of the first photoelectric conversion unit is incident on the first photoelectric conversion unit and light from the filter of the second photoelectric conversion unit is incident on the second photoelectric conversion unit.

15. The imaging device according to claim 10, wherein the first floating diffusion region is electrically connected to the second floating diffusion region.

16. The imaging device according to claim 10, wherein the first signal line is connected with a plurality of first voltage adjusting units, and the second signal line is connected with a plurality of second voltage adjusting units.

17. The imaging device according to claim 10, wherein the first controlling unit causes the first signal line and the terminal to be conductive in the period in which the second signal line and the terminal are to be non-conductive by the second controlling unit, and
the second controlling unit causes the second signal line and the terminal to be conductive in the period in which the first signal line and the terminal are to be non-conductive by the first controlling unit.

18. An imaging apparatus, comprising
the imaging device according to claim 10.

19. The imaging device according to claim 1, wherein the controlling circuit controls the first voltage adjusting unit in order for the voltage of the first signal line not to become the predetermined value or less in a period in which the first signal is output to the first signal line by the first output unit and controls the second voltage adjusting unit in order for the voltage of the second signal line not to become the predetermined value or less in a period in which the second signal is output to the second signal line by the second output unit.

* * * * *